(12) United States Patent
Chang et al.

(10) Patent No.: US 12,551,468 B2
(45) Date of Patent: *Feb. 17, 2026

(54) PHARMACEUTICAL COMPOSITION FOR ORAL ADMINISTRATION, FOR TREATMENT OF LIVER CANCER

(71) Applicant: ETNOVA Therapeutics Corp., Gyeonggi-do (KR)

(72) Inventors: Yong Min Chang, Daegu (KR); Sha Joung Chang, Gyeonggi-do (KR); Yeoun Hee Kim, Daegu (KR); Md Kamrul Islam, Daegu (KR)

(73) Assignee: ETNOVA THERAPEUTICS CORP, Gyeonggi-Do (KR)

( * ) Notice: Subject to any disclaimer, the term of this patent is extended or adjusted under 35 U.S.C. 154(b) by 702 days.

This patent is subject to a terminal disclaimer.

(21) Appl. No.: 17/755,214

(22) PCT Filed: Nov. 25, 2020

(86) PCT No.: PCT/KR2020/016757
§ 371 (c)(1),
(2) Date: Apr. 22, 2022

(87) PCT Pub. No.: WO2021/137439
PCT Pub. Date: Jul. 8, 2021

(65) Prior Publication Data
US 2022/0370417 A1 Nov. 24, 2022

(30) Foreign Application Priority Data
Dec. 31, 2019 (KR) .................. 10-2019-0178795

(51) Int. Cl.
  *A61K 31/428* (2006.01)
  *A61K 9/00* (2006.01)
  *A61P 35/00* (2006.01)

(52) U.S. Cl.
CPC .......... *A61K 31/428* (2013.01); *A61K 9/0053* (2013.01); *A61P 35/00* (2018.01)

(58) Field of Classification Search
CPC .. A61K 31/428; A61K 9/0053; A61K 9/0095; A61P 35/00; A61P 1/00; A61P 1/16
See application file for complete search history.

(56) References Cited

U.S. PATENT DOCUMENTS

| 8,299,285 B2 | 10/2012 | Dilworth et al. |
| 12,098,147 B2 * | 9/2024 | Chang ................ A61P 35/00 |

FOREIGN PATENT DOCUMENTS

| KR | 101836463 | 3/2018 | |
| KR | 20180055135 | 5/2018 | |
| KR | 20190129738 | 11/2019 | |
| WO | WO-2019216653 A1 * | 11/2019 | ........... A61K 31/282 |

OTHER PUBLICATIONS

CAS Registry No. 2097149-62-5, which entered STN on May 25, 2017. (Year: 2017).*
International Search Report and Written Opinion issued in Corresponding PCT Application No. PCT/KR2020/016757, dated Apr. 15, 2021 (English Translation provided).
Islam et al., "Synthesis and biological evaluation of benzothiazole aniline (BTA) derivatives and their platinum complexes as antitumor agents." (The 120th General Meeting of the Korean Chemical Society). Oct. 19-20, 2017 poster. (English Abstract).

* cited by examiner

*Primary Examiner* — Joseph K McKane
*Assistant Examiner* — Meghan C Heasley
(74) *Attorney, Agent, or Firm* — NORTON ROSE FULBRIGHT US LLP

(57) ABSTRACT

The present invention relates to a pharmaceutical composition for oral administration, for treatment of liver cancer, comprising a benzothiazole aniline derivative. The pharmaceutical composition, when orally administered, exhibits a therapeutic effect on liver cancer, in particular, an excellent effect of reducing the tumor size of liver cancer, while toxicity is significantly attenuated.

11 Claims, 9 Drawing Sheets

Tumor size change in liver cancer animal model

Body weight change in liver cancer animal model

Comparison of cytotoxicity in liver removed from liver cancer animal model

Comparison of cytotoxicity in kidney removed from liver cancer animal model

Fig. 8

A summary of side effects caused by anti-cancer drugs

| Toxic deaths/total | | | |
|---|---|---|---|
| Saline (I.V.) | Cisplatin (I.V.) | Present disclosure (I.V.) | Present disclosure (P.O.) |
| 0/6 | 1/6 | 1/5 | 0/5 |

Log IC50 value based on cell viability analysis

IC50 value based on cell viability analysis

PHARMACEUTICAL COMPOSITION FOR ORAL ADMINISTRATION, FOR TREATMENT OF LIVER CANCER

CROSS-REFERENCE TO RELATED APPLICATIONS

This application a national phase under 35 U.S.C. § 371 of International Application No. PCT/KR2020/016757, filed Nov. 25, 2020, which claims priority to Korean Patent Application No. 10-2019-0178795, filed Dec. 31, 2019. The contents of each of the referenced applications are incorporated into the present application by reference.

FIELD OF THE INVENTION

The present disclosure relates to a pharmaceutical composition for oral administration for treatment of liver cancer. More specifically, the present disclosure relates to a pharmaceutical composition for oral administration for treatment of liver cancer, the composition containing a benzothiazole aniline derivative.

DESCRIPTION OF RELATED ART

Liver cancer is a malignant tumor with a poor prognosis that ranks second in the world among the causes of death due to carcinoma, and an incidence rate thereof is particularly high in Asia including Korea. In more than 70% of liver cancer patients, radial surgery is impossible. Although the radical resection is performed, a probability of recurrence in other sites within 5 years is 50% or higher. A 5-year survival is smaller than 12%. Further, a probability of responding to systemic chemotherapy in advanced liver cancer is very low, and is lower than 10%. Therefore, there is a need for a liver cancer therapeutic agent with excellent liver cancer treatment effect. In particular, in Korea, an average of 16,000 new liver cancer patients occur every year, and a related treatment agent market is about 1.2 trillion won per year. A global liver cancer treatment agent market in 2019 reaches 1.57 trillion won. Thus, an effective liver cancer treatment agent has a very high market value.

On the other hand, an anticancer agent used clinically for treatment of liver cancer includes cisplatin as a cytotoxic anticancer agent (a therapeutic agent that inhibits growth and division of cells by attacking the cells themselves) has an effect of reducing a tumor size of the liver cancer, and of preventing the cancer from being worse. However, various side effects such as vomiting, decreased renal function, electrolyte changes, anemia, and bone marrow suppression have been reported. In particular, some cancer patients experience a rapid decline in renal function after a single administration of cisplatin. Accordingly, there is a great demand for development of anticancer drugs with reduced toxicity compared to existing anticancer drugs in order to prevent or alleviate these side effects.

SUMMARY OF THE INVENTION

One purpose of the present disclosure is to provide a pharmaceutical composition for treatment of liver cancer in which toxicity is alleviated and anticancer effect is excellent.

The above purpose of the present disclosure may achieved by providing a pharmaceutical composition for oral administration for treatment of liver cancer, the composition containing a compound represented by a following Chemical Formula 1 or a pharmaceutically acceptable salt thereof:

Chemical Formula 1

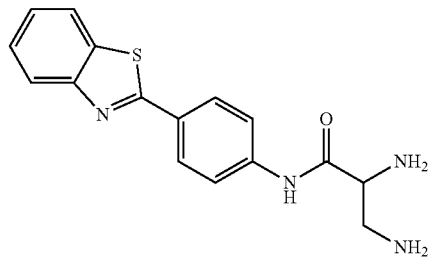

In the Chemical Formula 1,
$X_1$ represents NH, O or S,
L represents

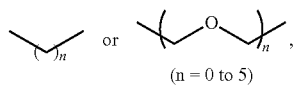

$(n = 0$ to $5)$

A represents a following Chemical Formula A-1:

Chemical Formula A-1

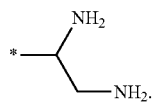

The pharmaceutical composition according to the present disclosure is intended for treatment of liver cancer. When the composition is administered orally, an effect of treating the liver cancer, specifically, an effect of reducing a size of liver cancer tumor is excellent, while toxicity thereof is remarkably alleviated.

BRIEF DESCRIPTION OF DRAWINGS

FIG. 8 compares survivals after drug administrations to a liver cancer animal model according to Example 5.

DETAILED DESCRIPTION OF THE INVENTION

Figure 1:
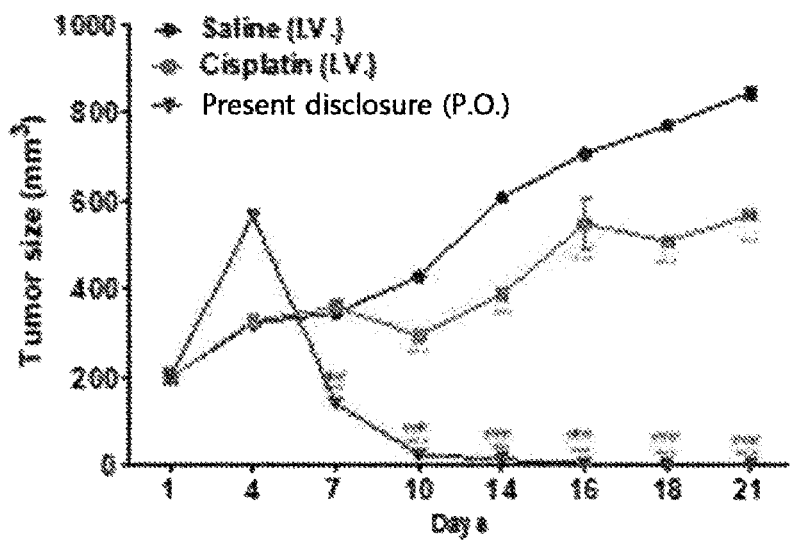
FIG. 1 shows graphs showing changes in a tumor size and a body weight for 3 weeks according to an anticancer effect test in a liver cancer animal model using a human liver cancer cell line of Example 1.
Figure 1:
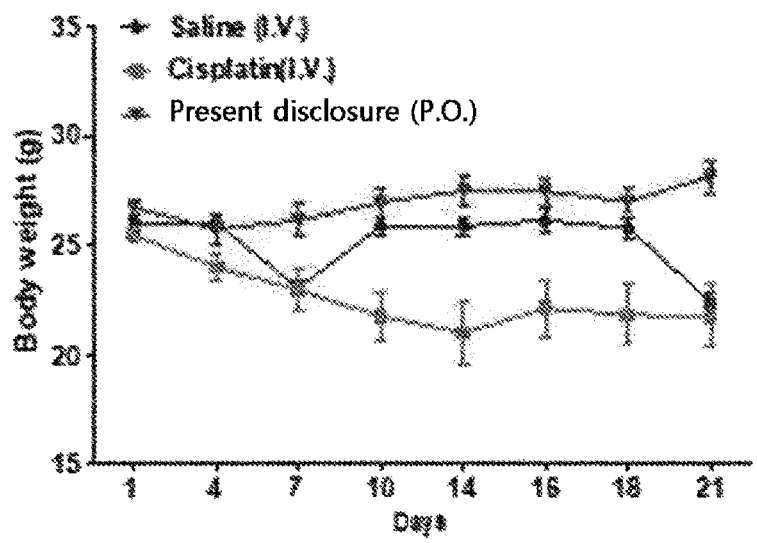

The terminology used herein is for the purpose of describing particular embodiments only and is not intended to be limiting of the present disclosure. Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A pharmaceutical composition for oral administration for treatment of liver cancer according to the present disclosure contains a compound represented by a following Chemical Formula 1 or a pharmaceutically acceptable salt thereof:

Chemical Formula 1

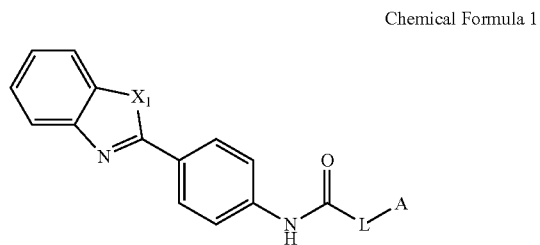

wherein in the Chemical Formula 1, $X_1$ represents NH, O or S,

L represents

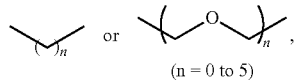

(n = 0 to 5)

A represents a following Chemical Formula A-1:

Chemical Formula A-1

In the Chemical Formula 1, $X_1$ represents S. L represents

(n = 0 to 5).

Further, the compound represented by the Chemical Formula 1 includes a compound represented by a following Chemical Formula 1-1:

Chemical Formula 1-1

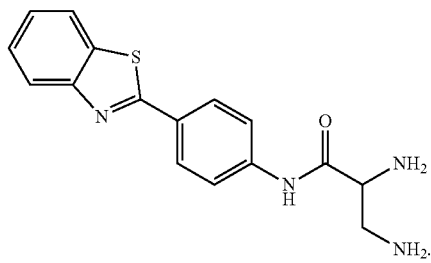

The compound of the Chemical Formula 1 according to the present disclosure may be used in a form of a pharmaceutically acceptable salt thereof. The term "pharmaceutically acceptable salt" refers to a salt of the compound that retains pharmacological activity of the parent compound. For example, the salt may include (i) a salt formed with an inorganic acid such as hydrochloric acid, hydrobromic acid, sulfuric acid, nitric acid, and phosphoric acid; (ii) a salt formed with an organic acid such as acetic acid, propionic acid, isobutyric acid, glycolic acid, lactic acid, pyruvic acid, malonic acid, succinic acid, glutaric acid, fumaric acid, malic acid, tartaric acid, citric acid, ascorbic acid, palmitic acid, maleic acid, hydroxymaleic acid, benzoic acid, hydroxybenzoic acid, phenylacetic acid, cinnamic acid, salicylic acid, methanesulfonic acid, benzenesulfonic acid and toluenesulfonic acid; (iii) a salt formed when an acidic proton present in the parent compound is replaced with metal ions, such as alkali metal ions, alkaline earth metal ions, or aluminum ions; (iv) coordination with an organic base such as ethanolamine, diethanolamine, triethanolamine, N-methylglucamine; or (v) a salt of an amino acid such as alginate.

The pharmaceutical composition according to the present disclosure may include the compound represented by the Chemical Formula 1 or the pharmaceutically acceptable salt thereof alone. The composition may further include a pharmaceutically acceptable carrier in addition thereto. The pharmaceutically acceptable carrier may be one commonly used in the pharmaceutical field, and may include an excipient (e.g., starch, calcium carbonate, sucrose, lactose, sorbitol, mannitol, cellulose, etc.) or a diluent (e.g., physiological saline, purified water, etc.).

Further, if necessary, the pharmaceutical composition according to the present disclosure may further include a pharmaceutically acceptable additive other than the above pharmaceutically acceptable carrier. The pharmaceutically acceptable additive may include, for example, binders, disintegrants, lubricants, coating agents, a film coating base, an enteric film coating base, a soft capsule base, a solubilizing agent, an emulsifying agent, a suspending agent, a stabilizer, a buffering agent, an antioxidant, a surfactant, a sweetening agent, a flavoring agent, a preservative, a thickening agent, a flavoring agent, or a coloring agent.

The pharmaceutical composition according to the present disclosure is administered orally, and may be prepared in a form of a solid or liquid formulation, specifically, a liquid formulation. The solid formulation forms may include, for example, tablets, capsules (soft & hard capsules), powders, granules, pills, troches, and the like, and liquid dosage forms may be, for example, elixirs, suspensions, emulsions, solutions, syrups, lemonade. In a form of the tablet, the formation may further include, in addition to the active ingredient (the compound of Chemical Formula 1 or a salt thereof), a carrier such as lactose and corn starch, a lubricant such as magnesium stearate, a binder such as methylcellulose, microcrystalline cellulose, polyvinyl alcohol, a disintegrant such as bentonite, sodium alginate. In a form of the liquid formulation, the active ingredient may be formulated together with a carrier such as purified water or physiological saline, and if necessary, a solubilizer such as monostearate sucrose, a stabilizer such as polyvinylpyrrolidone, etc. In a form of am aqueous suspension for oral administration, the active ingredient may be formulated together with a suspending agent and, if necessary, surfactants, preservatives, stabilizers, and the like.

Further, a dosage of the pharmaceutical composition may be determined in consideration of an administration method, age, sex, severity, condition of a patient, an inactivation rate, and drugs used in combination, and may be administered once or may be divided into several doses. The active ingredient in the pharmaceutical composition, that is, the compound of the Chemical Formula 1 according to the present disclosure, or the pharmaceutically acceptable salt thereof may be administered in an amount of 0.005 to 100 mg/kg of body weight, for example, 1 to 10 mg/kg of body weight for one week and may be administered once or several times a week. The composition may be administered orally once a day or may be divided into several times.

According to another embodiment of the present disclosure, the present disclosure provides a method for treating liver cancer, the method comprising orally administering the compound of the Chemical Formula 1 or the pharmaceutically acceptable salt thereof to a subject in need of treatment. The method may further include identifying a subject in need of prevention or treatment of the liver cancer before the oral administration step.

If necessary, the compound of the Chemical Formula 1 according to the present disclosure or the pharmaceutically acceptable salt thereof may be administered in combination with other anticancer agents for treating the liver cancer.

Hereinafter, the present disclosure will be described in detail based on Examples, and the present disclosure is not limited to the following Examples.

Example 1. Test of Anticancer Effect in Human Liver Cancer Cell Line

Cell viability analysis of cancer cells using CCK-8 was performed on the human liver cancer cell line HepG2 as follows. In this experiment, the compound of the Chemical Formula 1-1 was used as the compound according to the present disclosure. For reference, the CCK-8 (Cell counting kit-8) performed the analysis using a highly water-soluble tetrazolium salt-SST-8. The analysis is based on the fact that when [2-(2-methoxy-4-nitrophenyl)-3-(4-nitrophenyl)(2,4-disulfophenyl)-2H-tetrazolium, monosodium salt] is reduced under presence of an electron mediator, a water-soluble formazan orange dye is produced, and an amount of the formazan dye produced by dehydrogenase in cells is directly proportional to the number of living cells. A specific experimental method is as follows.

The human liver cancer cell line HepG2 was grown in Eagle's Minimum Essential Medium (EMEM) supplemented with 10% Fetal bovine serum (FBS) and 1% Antibiotic-Antimycotic. For cell viability analysis, stabilized cells were suspended in 200 μL of medium at a density of $1 \times 10^4$ cells/well and were planted in each well of a 96-well plate. The cells were attached to a 37° C. and 5% $CO_2$ incubator and were allowed to be stabilized for at least 14 hours. The next day, the growth medium was removed. The compound according to the present disclosure and cisplatin were diluted to various concentrations (0, 1, 5, 10, 25, 50, 75, 100 μM) and then were cultured in 100 μL of EMEM serum free medium at 37° C. and 5% $CO_2$ conditions for 22 hours. 10 μL of CCK-8 solution was added to each well and the cells were further incubated for 2 hours. The cultured plate was measured based on measurement of absorbance at 450 nm using a microplate reader.

Cell viability (%)=(B/A)×100(%) Cell viability calculation equation:

(where A denotes an absorbance value measured in a control well, and B denotes an absorbance value measured in a well containing the drug).

The calculated value was graphed using a GraphPad Prism application. A statistical significance of the obtained value was identified via one-way ANOVA with Dunnett's multiple comparison test. ***p<0.001 vs. Cisplatin indicates significance. The results are shown in FIG. 9.

Figure 9:
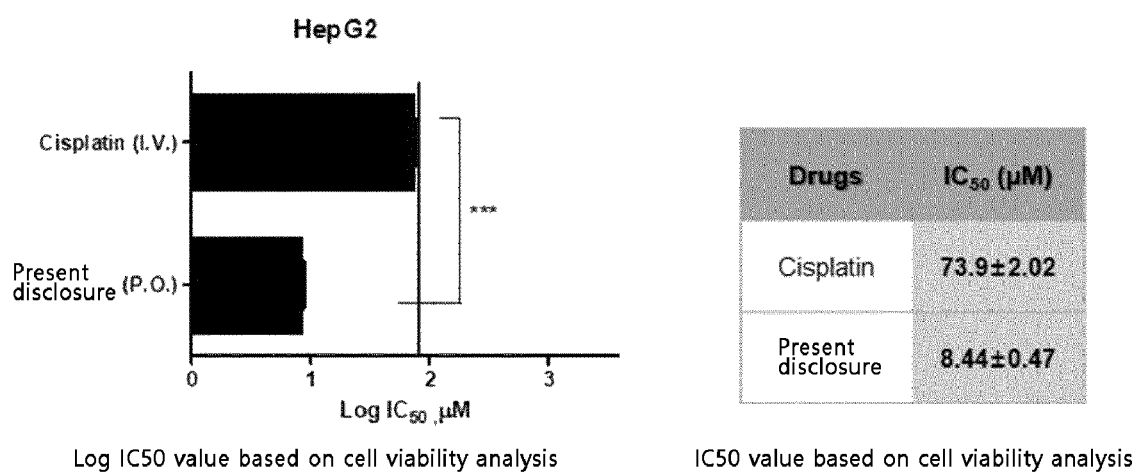
FIG. 9 compares cell viability after drug administrations of cisplatin and a compound of Chemical Formula 1-1 according to the present disclosure.

As may be identified in FIG. 9, the compound according to the present disclosure had an $IC_{50}$ value (μM) calculated based on the cancer cell viability in the liver cancer cell line was approximately 9 times smaller than that when using Cisplatin. This indicates that the compound according to the present disclosure destroys liver cancer cells in a significantly excellent manner compared to Cisplatin.

Example 2. Anticancer Effect Test in Liver Cancer Animal Model Using Human Liver Cancer Cell Line The human liver cancer cell line HepG2 was grown in Eagle's Minimum Essential Medium (EMEM) medium supplemented with 10% Fetal bovine serum (FBS) and 1% Antibiotic-Antimycotic. For liver cancer animal model production, stabilized cells were suspended in a 1:1 mixture (100 μL) of EMEM serum free media: Matrigel at a density of $5 \times 10^6$ cells/animal and then the suspension was transplanted subcutaneously to a flank of a nude mouse (5 weeks old, male). We have waited for the tumor formation for 3 weeks. When the tumor volume reached 200 mm³, the body weight and the tumor size were measured and then the mice were randomly grouped. The mice were divided into 3 groups. Saline alone was administered intravenously to each group (Saline administered group (n=6, IV)). Cisplatin adjusted to pH 4 using NaCl aqueous solution, HCl aqueous solution, or NaOH aqueous solution was administered intravenously thereto (Cisplatin administered group (n=6, IV)). The compound according to the present disclosure (compound of Chemical Formula 1-1) dissolved in saline was forcibly administered orally thereto (administered group according to the present disclosure (n=6, P.O.)). The administration intervals and frequencies of administration to the groups were equal to each other. The administration was performed once a day and twice a week for 3 weeks. The dosage of Cisplatin (intravenous administration) was 5 mg/kg. The composition was orally administered at 100 mg/kg to the administered group according to the present disclosure.

The mice were anesthetized immediately prior to the administration, and then the body weight thereof was measured to observe the change in the body weight. The change in the tumor size over time was observed based on a following equation.

Average tumor volume calculation equation:

$V$ (mean tumor volume)=$(A \times B \times B)/2$ (In the above equation, A denotes a length of a long side and B denotes a length of a short side).

The changes in the body weight and the tumor size of the mouse as observed for 3 weeks as described above are shown in FIG. 1. As may be identified in FIG. 1, when the compound according to the present disclosure was administered orally to the liver cancer animal model, there was no decrease in the body weight. Thus, there was no toxicity of the drug. Further, the tumor disappeared or the size thereof was significantly reduced.

Figure 2:
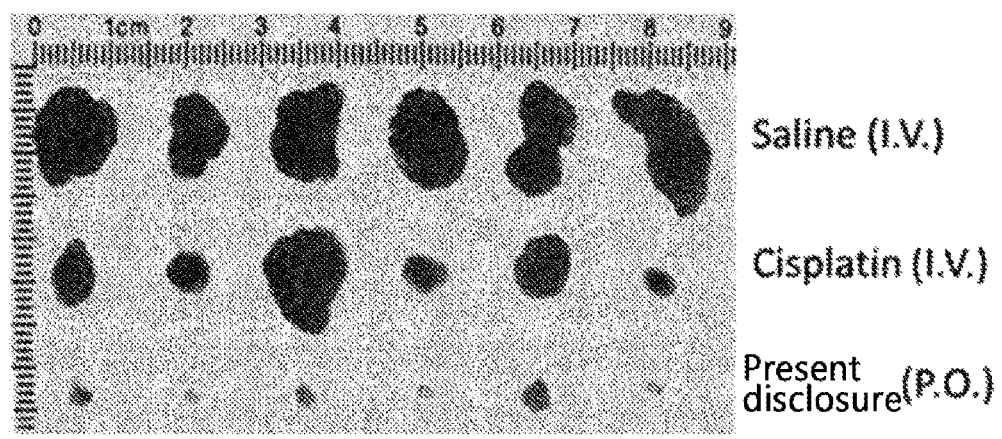
FIG. 2 is a photograph of a relative size of a tumor isolated from the animal model 21 days after the anticancer effect test in the liver cancer animal model using a human liver cancer cell line of Example 2.

Further, on 21 days after the administration, a start time of tumor necrosis in the saline group was designated as an end point of the experiment. All nude mice participating in the experiment were sacrificed. Only the tumor was isolated from the flank thereof, and the relative size of the tumor was photographed. The photographed tissue pictures are shown in FIG. 2. In FIG. 2, grayish-white dots mean that all tumors have disappeared and an individual has a tumor which may not be distinguished. In FIG. 2, it may be identified that tumor cells remain in the Saline-administered group or Cisplatin-administered group, but tumors significantly decrease or completely disappear when the compound according to the present disclosure is orally administered.

Example 3. Comparative Study of Blood and Histological Toxicity

Figure 3:
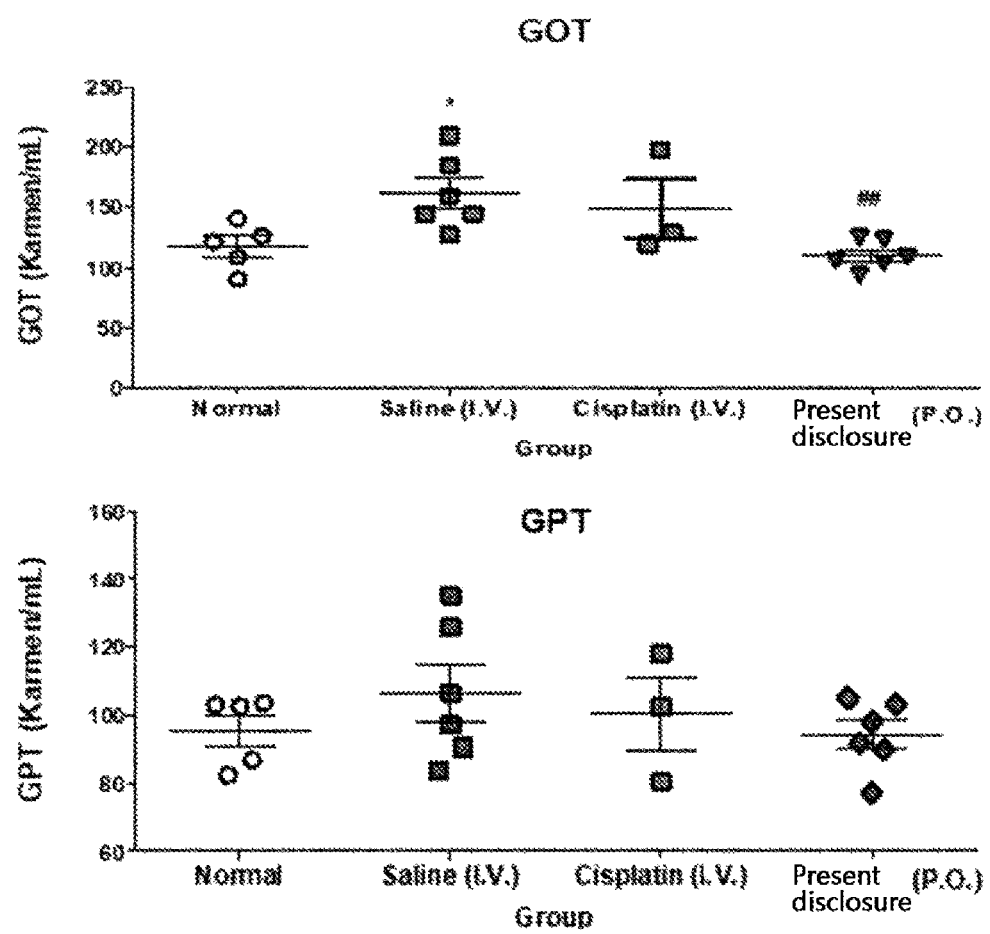
FIG. 3 shows GOT and GPT activity levels in serum measured according to a toxicity comparison test in Example 3.

Toxicity was analyzed based on activity assay of GOT and GPT. A specific experimental method is as follows: GOT and GPT activity in serum was measured using a reagent kit (Asan Pharmaceutical) prepared according to a method of Reitman-Frankel. At an end of the experiment, blood was collected from an abdominal vena cava of the mice to which the compound was administered, and serum was separated therefrom. When a substrate solution was added to the serum which in turn was heated for a certain period of time, oxalacetate and glutamic acid were generated from the substrate solution for GOT measurement (aspartate, a-ketoglutarate mixture) due to the action of serum GOT, while under GPT action, pyruvate and glutamic acid were generated from the substrate solution for GPT measurement (Alanine, a-ketoglutarate mixture). Then, 2,4-dinitrophenylhydrazone as a color-assuming reagent was added thereto such that 2,4-dinitrophenylhydrazone of oxaloacetate or pyruvate was produced, and NaOH was added thereto to develop color, and then absorbance was measured (505 nm). The activity of GOT and GPT in serum was calculated from a standard calibration curve as prepared separately. FIG. 3 shows the GOT and GPT activities in the serum.

Figure 4:
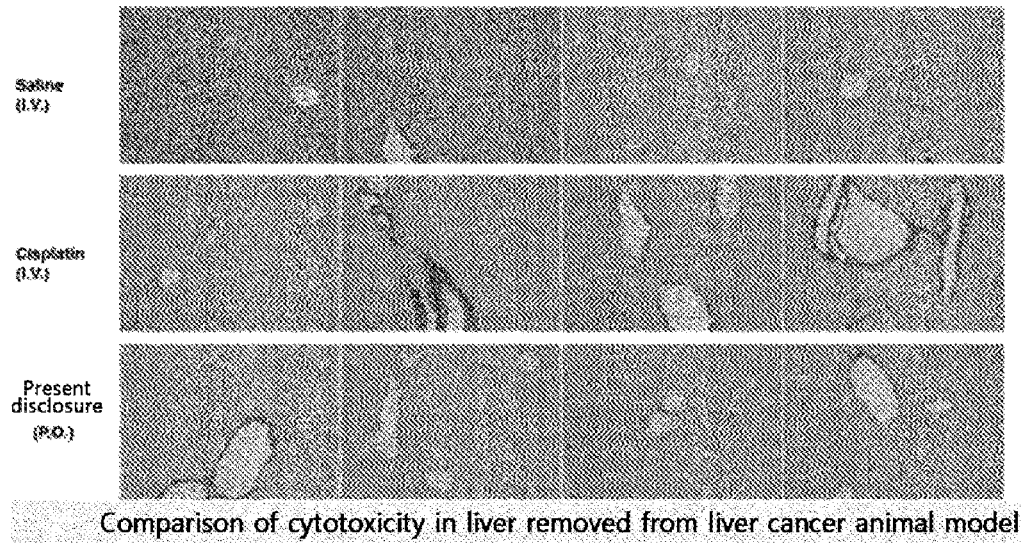
FIG. 4 is a photograph of liver and kidney tissues obtained after drug administration in an animal model of liver cancer in the toxicity comparison test of Example 3.
Figure 4:
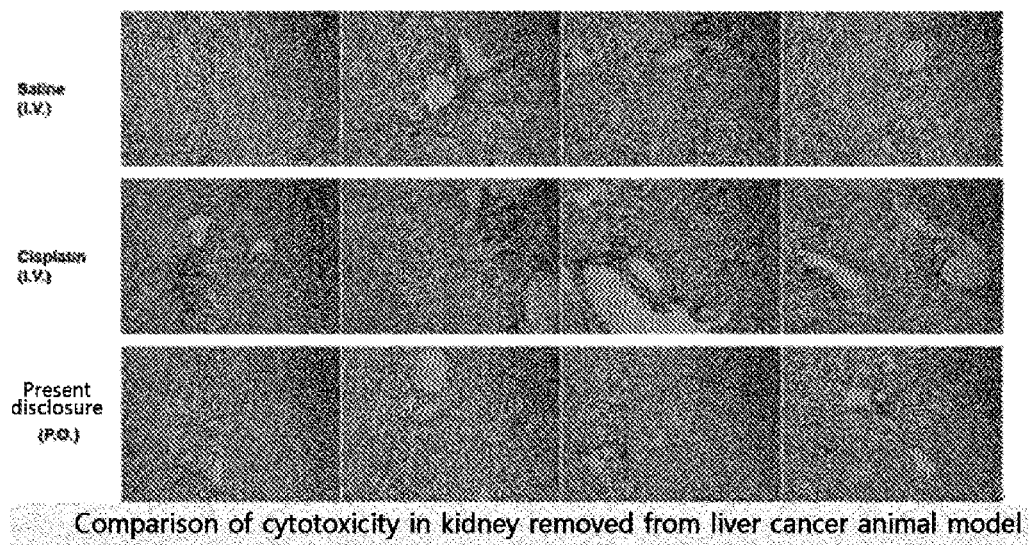

At the end of the experiment, the blood of nude mice participating in the experiment was perfused and livers and kidneys were obtained. The tissues were fixed in 4% paraformaldehyde. A paraffin-embedding process was performed thereon, and thus, tissue sections with a thickness of 4 μm were prepared, followed by Sirius red staining. FIG. 4 shows pictures of the obtained tissue through an optical microscope.

As may be identified from FIG. 3 and FIG. 4, the toxicity in the liver and kidneys was significantly lowered when the compound according to the present disclosure was administered orally.

Example 4. Comparison of Survival Rate

Figure 5:
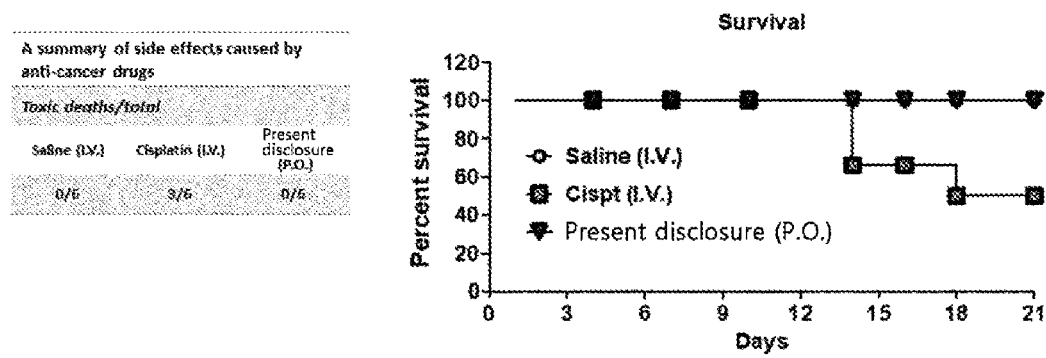
FIG. 5 compares survivals after drug administrations to a liver cancer animal model according to Example 4.

FIG. 5 shows the comparison of survivals over time after drug administration as observed in the animal model test performed according to Example 2 as described above. As may be identified in FIG. 5, the survival was higher when the compound according to the present disclosure was administered.

Figure 6:
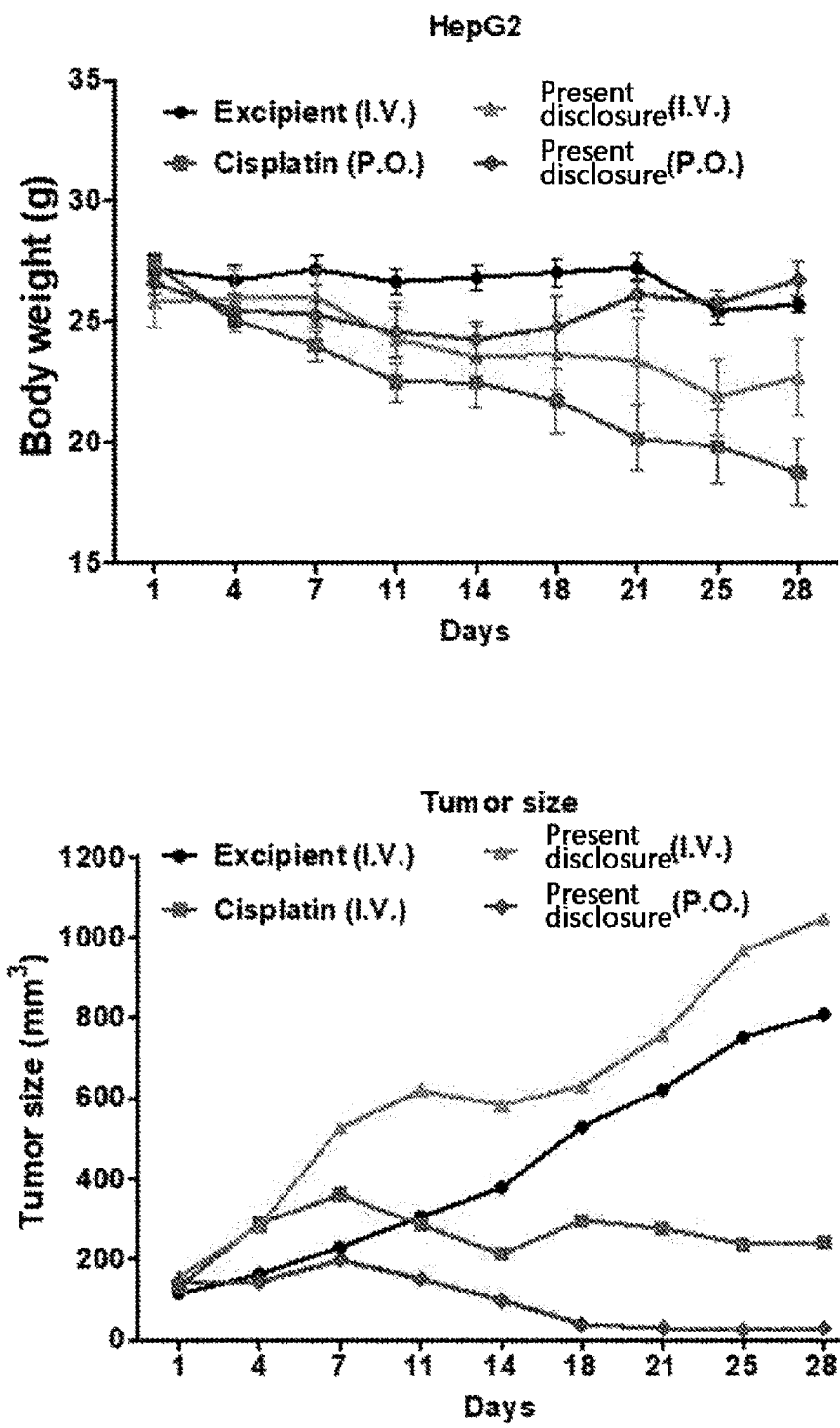
FIG. 6 shows graphs showing changes in a tumor size and a body weight for 4 weeks according to the anticancer effect test in the liver cancer animal model using a human liver cancer cell line of Example 5.
Figure 7:
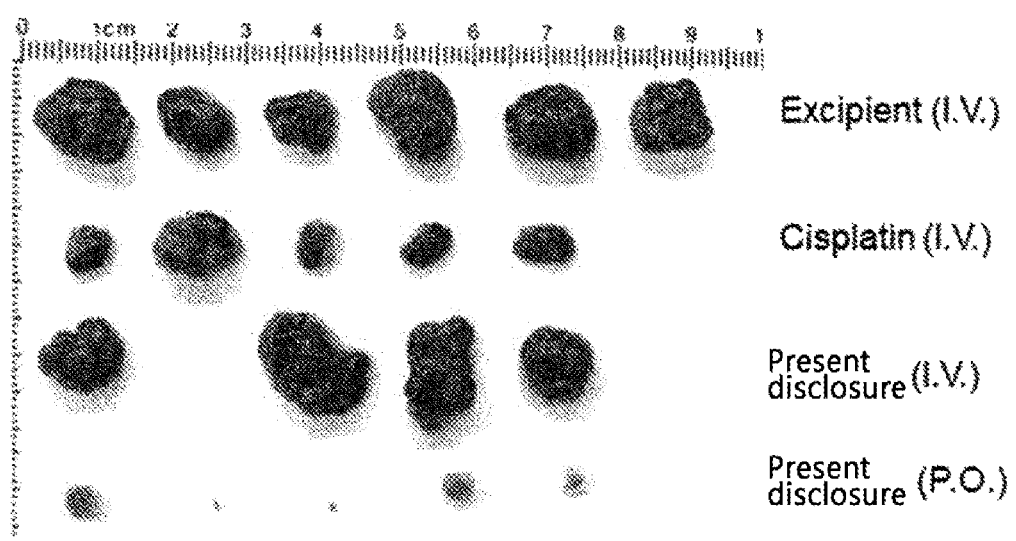
FIG. 7 is a photograph of a relative size of a tumor isolated from the animal model 28 days after the anticancer effect test in the liver cancer animal model using the human liver cancer cell line of Example 5.

Example 5. Comparative Test of Anticancer Effect According to Administration Route Change Human liver cancer cells were suspended in a 1:1 mixture (100 μL) of EMEM serum free media: Matrigel at a density of $2\times10^6$ cells/animal and the suspension was transplanted subcutaneously into the flank of nude mice (5 weeks old, male). We have waited for the tumor formation for 4 weeks. When the tumor volume reached 100 $mm^3$, the body weight and the tumor size were measured and then the mice were randomly grouped. The mice were divided into 4 groups. Saline alone was administered intravenously to each group (Saline administered group (n=6, I.V.)). Cisplatin adjusted to pH 4 using NaCl aqueous solution, HCl aqueous solution, or NaOH aqueous solution was administered intravenously thereto (Cisplatin administered group (n=5, I.V.)). The compound according to the present disclosure (compound of the Chemical Formula 1-1) dissolved in saline was administered intravenously thereto (I.V. administered group of the composition according to the present disclosure (n=5, I.V.)). The compound according to the present disclosure (compound of the Chemical Formula 1-1) dissolved in saline was forcibly administered orally thereto (administered group according to the present disclosure (n=5, P.O.)). The administration intervals and frequencies of administration to the groups were equal to each other. The administration was performed once a day and twice a week for 4 weeks. The dosage in the intravenous administration was 5 mg/kg. The composition was orally administered at 100 mg/kg to the administered group according to the present disclosure. The mice were anesthetized immediately prior to administration, and the body weight was measured to observe the change in the body weight. The changes in the body weight and the tumor size for 4 weeks were measured in the same manner as in Example 1 above, and the results are shown in FIG. 6. In the same manner as in Example 2, the tumor was separated and the relative size of the tumor was measured, and the photographed tissue is shown in FIG. 7. Further, FIG. 8 shows the comparison of the survivals over time after drug administration in the same manner as in Example 4. As may be identified in FIGS. 6, 7, and 8, it may be identified that when the compound according to the present disclosure is administered orally, the toxicity based on the change in body weight may be lowered and the anticancer effect may be significantly better, compared to the intravenous administration thereof.

What is claimed is:

1. A method for treating liver cancer, the method comprising:
   orally administering to a subject in need of liver cancer treatment a compound represented by a following Chemical Formula 1 or a pharmaceutically acceptable salt thereof:

[Chemical Formula 1]

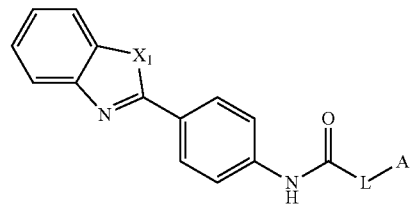

wherein in the Chemical Formula 1, $X_1$ represents NH, O or S,

L represents

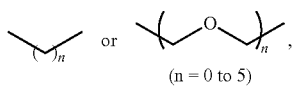

(n = 0 to 5)

A represents a following Chemical Formula A-1:

[Chemical Formula A-1]

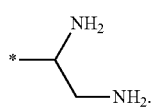

2. The method of claim 1, wherein in the Chemical Formula 1, $X_1$ represents S, and L represents

(n = 0 to 5).

3. The method of claim 1, wherein the compound represented by the Chemical Formula 1 is a compound represented by a following Chemical Formula 1-1:

[Chemical Formula 1-1]

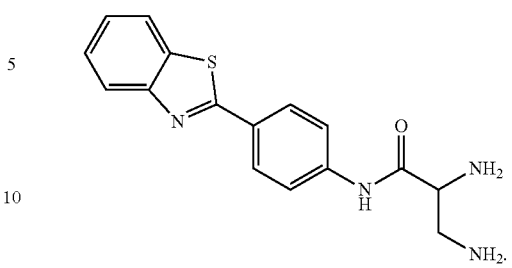

4. The method of claim 1, wherein the compound represented by the Chemical Formula 1 or the pharmaceutically acceptable salt thereof is part of a pharmaceutical composition.

5. The method of claim 4, wherein the pharmaceutical composition further comprises a pharmaceutically acceptable carrier.

6. The method of claim 5, wherein the pharmaceutically acceptable carrier includes an excipient or a diluent.

7. The method of claim 6, wherein the excipient comprises one or more of starch, calcium carbonate, sucrose, lactose, sorbitol, mannitol, cellulose or magnesium stearate.

8. The method of claim 4, wherein the pharmaceutical composition is in a form of a liquid formulation.

9. The method of claim 1, further comprising identifying the subject in need of treatment of the liver cancer before the oral administration step.

10. The method of claim 1, wherein the subject in need of liver cancer treatment is a human.

11. The method of claim 1, wherein the compound represented by the Chemical Formula 1 or the pharmaceutically acceptable salt thereof is administered in an amount of 0.005 to 100 mg/kg of body weight of the subject.

* * * * *